United States Patent [19]

Diliello et al.

[11] Patent Number: 4,995,692

[45] Date of Patent: Feb. 26, 1991

[54] FIBER OPTIC STAR COUPLER

[75] Inventors: Laura K. Diliello; Gregory D. Miller, both of Warren; Robert E. Steele, Cortland, all of Ohio

[73] Assignee: General Motors Corporation, Detroit, Mich.

[21] Appl. No.: 475,569

[22] Filed: Feb. 6, 1990

[51] Int. Cl.$^5$ .............................................. G02B 6/28
[52] U.S. Cl. ............................ 350/96.16; 350/96.15
[58] Field of Search ................ 350/96.15, 96.16, 96.20

[56] References Cited

U.S. PATENT DOCUMENTS

| | | | |
|---|---|---|---|
| 4,213,670 | 7/1980 | Milton et al. | 350/96.16 |
| 4,360,248 | 11/1982 | Bicket et al. | 350/96.16 |
| 4,362,357 | 12/1982 | Stockmann et al. | 350/96.16 |
| 4,449,783 | 5/1984 | Witte | 350/96.16 |
| 4,484,794 | 11/1984 | Witte | 350/96.16 |
| 4,650,278 | 3/1987 | Maciejko et al. | 350/96.20 |
| 4,714,313 | 12/1987 | Kapany et al. | 350/96.16 |
| 4,846,543 | 7/1989 | Kapany et al. | 350/96.16 |
| 4,943,136 | 7/1990 | Popoff | 350/96.16 |

*Primary Examiner*—John D. Lee
*Attorney, Agent, or Firm*—F. J. Fodale

[57] ABSTRACT

A star coupler comprises a flexible optical ribbon curved so that input and output fibers attach to the same side of the coupler. A connector mates a linear array of fibers to each end of the ribbon. The side walls of the ribbon are rounded to match the contour of the outboard fibers of each array. The ribbon thickness is about 91% of the fiber diameter to minimize insertion loss.

14 Claims, 2 Drawing Sheets

FIBER OPTIC STAR COUPLER

FIELD OF THE INVENTION

This invention relates to fiber optic couplers and particularly to a passive fiber optic star assembly.

BACKGROUND OF THE INVENTION

A passive fiber optic star is a device used to distribute the optical information from one fiber optic source to several fiber optic receivers simultaneously, without an external source of power. The heart of a fiber optic star is its mixing element, a device by which the optical signal coming in from any one of several input fibers is distributed more or less evenly among the output fibers. Characteristic features of mixing elements include the number of input and output ports, connectorization method, uniformity, insertion loss and excess loss. Insertion loss is the amount of attenuation experienced between an input and output port. Excess loss is the amount of attenuation of the input signal before reaching the output ports.

It is already known to employ a slab type mixer as a fiber optic star. For example, the U.S. Pat. No. 4,213,670 issued to Milton et al on July 22, 1980 discloses a planar fiber optic star wherein the fibers from the transmission line cable are assembled side-by-side along the width of a flat, rectangular in cross section, ribbon fiber mixing element to form a planar optical coupler. The input and output optical fibers are in line so that they are coupled to opposite ends of the planar mixer. The ribbon has a width greater than the width of all the transmission fibers and has a thickness less than that of the core diameter of the fibers. Shims having a thickness substantially the same as the fiber cladding thickness are used to align the fiber with the ribbon.

U.S. Pat. No. 4,362,357 issued to Stockmann et al on Dec. 7, 1982 shows a planar star coupler having input and output fibers arranged in line, like Millon et al, with the fibers extending from opposite sides of the coupler. Stockmann et al also has an embodiment with a rigid semicircular glass mixer which allows the input and output fibers to extend from the same side of the device. The two groups of fibers lie in the same plane and they are spread over a width at least as great as the maximum dimension of the semicircular mixer.

U.S. Pat. No. 4,484,794 issued to Witte on Nov, 27, 1984 and U.S. Pat. No. 4,449,783 to Witte on May 22, 1984 each disclose a mixer element formed by a planar waveguide having a thickness which is approximately equal to the diameter of the fiber elements. These also require the input fibers to be in line and extending from opposite sides of the device.

SUMMARY OF THE INVENTION

It is therefore an object of the invention to provide a fiber optic star coupler configured for compactness and convenience of routing of the input and output transmission fibers.

Another object is to provide such a fiber optic star which minimizes the insertion loss and at the same time minimizes the effects of production tolerances on the losses.

The invention is carried out by a fiber optic star assembly for coupling signals between optical fibers comprising: first and second sets of optical fibers, the sets having continuous fiber ends arranged in respective parallel linear arrays, a flexible optical ribbon having a curved center portion and closely spaced parallel end portions, the minimum radius of curvature of the curved center portion being sufficiently large to avoid significant optical loss due to curvature, the end portions being spaced by a distance substantially less than the said minimum radius of curvature, the ribbon having a width substantially matching the width of each linear array, and means for holding each linear array of fiber ends in line with the ribbon end portions for coupling between the fibers and the ribbon.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

The ensuing description is directed to a star coupler assembly having seven inputs and seven outputs. Other numbers of fibers could be used as well with a corresponding adjustment in the ribbon width. Each output receives substantially equal amounts of energy from each input so that the outputs will be essentially the same. The disclosed design is particularly well adapted to automotive use and is thus suitable for high volume production at relatively low cost. Plastic optical elements are used but the substance of the invention pertains as well to glass materials and to other applications.

Figure 1:
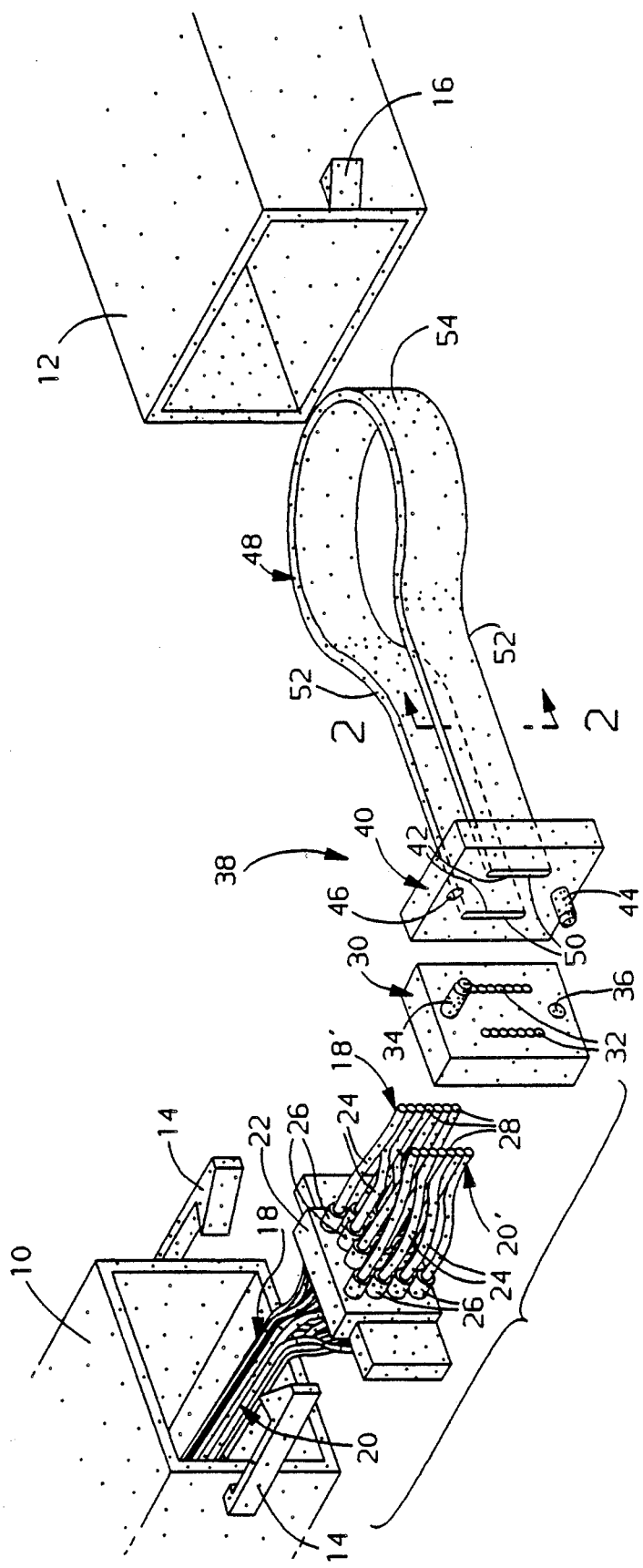
FIG. 1 is an exploded view of a fiber optic star and transmission line assembly, according to the invention.

As shown in FIG. 1, a box-like housing has two parts 10 and 12 with fingers 14 and lugs 16, respectively, which snap together. Two bundles or sets 18 and 20 of individually jacketed optical transmission fibers enter together through one end of the housing part 10 and are held in a multi-apertured block 22 which receives each fiber 24 in its jacket 26 and secures them in an orderly pattern. The jackets 26 are removed from the ends 28 of the fibers which protrude beyond the block 22. The unjacketed ends 28 are held in a pair of parallel linear arrays 18' and 20' by a fiber holder 30 provided with two lines of holes 32 which snugly receive the ends 28. The ends 28 are cut off flush with the face of the fiber holder 30 and polished. The holder 30 has an alignment pin 34 protruding from the face and an aperture 36 for receiving a like pin, to thereby form one part of a connector 38.

A second part of the connector 38 comprises a ribbon holder 40 having a pair of parallel slots 42 spaced for alignment with the fiber ends 28, an alignment pin 44 for mating with the aperture 36 of the fiber holder 30 and an aperture 46 for receiving the pin 34. A flexible curved optical ribbon 48 which serves as the star mixer has two ends 50 secured in the slots 42 fitting flush with the face of the holder 40 and polished. The ribbon ends 50 and the fiber ends 28 are aligned and abut when the connector parts are joined. When the parts are assembled as described above and the connector 38 is joined, efficient energy coupling occurs between the fiber arrays 18' and 20' and the ribbon 48. The assembly is completed by inserting the ribbon 48 into the housing portion 12 and joining the housing portions.

The flexible ribbon 48 has a concave portion 52 adjoining each end and an intermediate convex portion 54 which joins the concave portions 52, resulting in a hairpin shape. That is, the radius of the curved portion (about 18 mm) is much greater than the spacing between the ends 50. A spacing of about 5 mm is desirable. This allows the connector 38 to be small. The convex portion of the ribbon comprises the major part of the ribbon length and extends through an arc of perhaps 270 degrees or more. The concave portions are just sufficient to connect the convex curve to the ends 50 at the connector 38. The convex and concave curves have the same radius of curvature.

Materials used for the optical elements comprise PMMA (polymethyl methacrylate) having an index of refraction of 1.492 clad with a 0.02 mm thick material having an index of refraction of 1.417 for the fiber and 1.405 for the ribbon. The fiber ends 28 and the ribbon ends 50 are secured to their respective holders 30, 40 with an optical grade epoxy.

Figure 2:
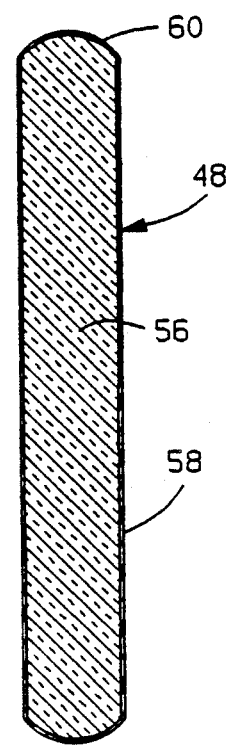
FIG. 2 is a cross-sectional view of a star mixer taken along line 2—2 of FIG. 1, according to the invention.
Figure 3:
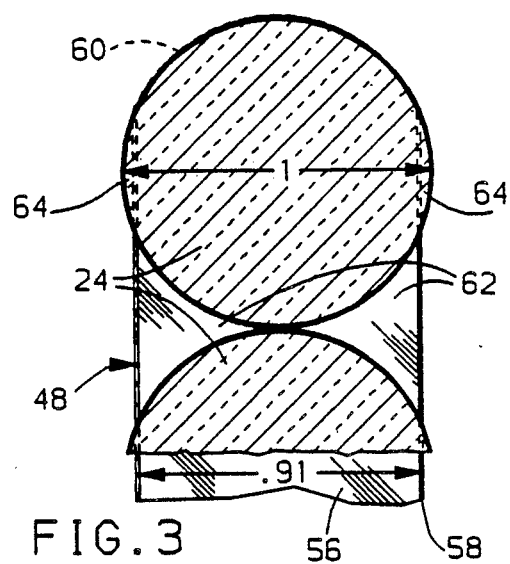
FIG. 3 is an enlarged fragmentary view of an end of the star mixer and transmission fibers, in cross section, coupled to the mixer, according to the invention.

Certain design features have been incorporated to optimize efficiency of light transfer within the ribbon 48 as well as across the interface with the fibers. The ribbon 48 cross section is shown in FIG. 2. The ribbon core 56 is covered with cladding 58. The width of the ribbon is the same as the total width of the fiber array. A seven node star coupler for 1 mm diameter fibers is thus 7 mm wide. The side walls 60 of the ribbon are rounded to conform to the outboard fibers in the array, as best shown in FIG. 3. When a rectangular cross section ribbon is used, the corners extend beyond the fiber so that light is lost upon transmission from the ribbon to the fibers. The rounded side walls 60 prevent that loss. In addition, skew rays emitted from a fiber can have exit angles greater than those allowed by the side wall of the ribbon. By using rounded side walls instead of flat walls, a smaller angle is offered to the entering ray and some of the skew rays are preserved.

Figure 4:
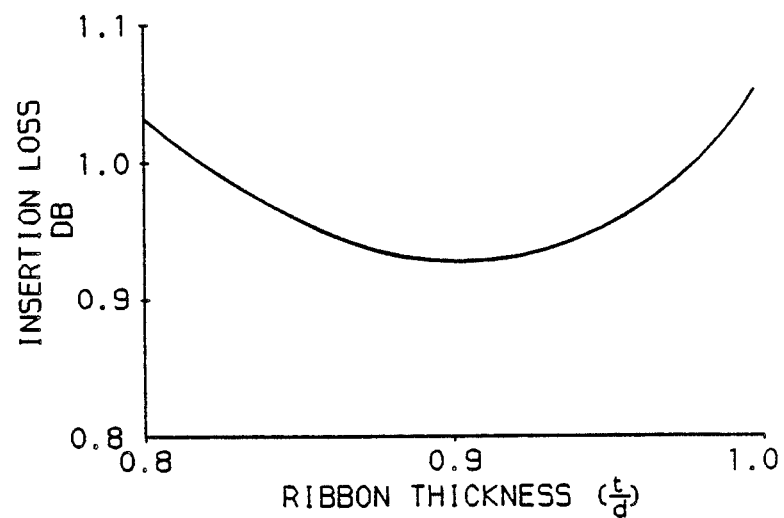
FIG. 4 is a curve of insertion loss due to geometrical mismatch of fibers and the mixer versus the ribbon thickness.

As further shown in FIG. 3, the thickness of the ribbon 48 is less than the diameter of the fiber 24. When the fiber core is 1 mm in diameter the optimum ribbon thickness is nominally 0.91 mm or more accurately 0.908 mm. If the ribbon thickness equals the fiber diameter, light is efficiently coupled from the fibers to the ribbon but much light is lost upon transmission from the ribbon to the fiber due to the large interstitial spaces 62 between the round fibers. These spaces are reduced in size by making the ribbon thinner than the fiber but that causes some losses during transmission to the ribbon due to segments 64 of the fiber which extend beyond the ribbon 48. It can be shown that the insertion loss, IL, due solely to this geometrical mismatch is $$IL(k) = 10 \log\{(1/4k pi)(pi - 2 \cos^{-1} k + 2k^2[(1/k^2) - 1]^{1/2})^2\}$$

where $k = t/d$, or the ratio of the ribbon thickness, t, to the fiber diameter, d. This curve is plotted in FIG. 4. The least insertion loss, about 0.92 db occurs where $k = 0.908$; i.e., the ribbon thickness is nominally 91% of the fiber diameter. Thus the system efficiency is optimized by selecting a ribbon thickness at or very close to this value.

Figure 5:
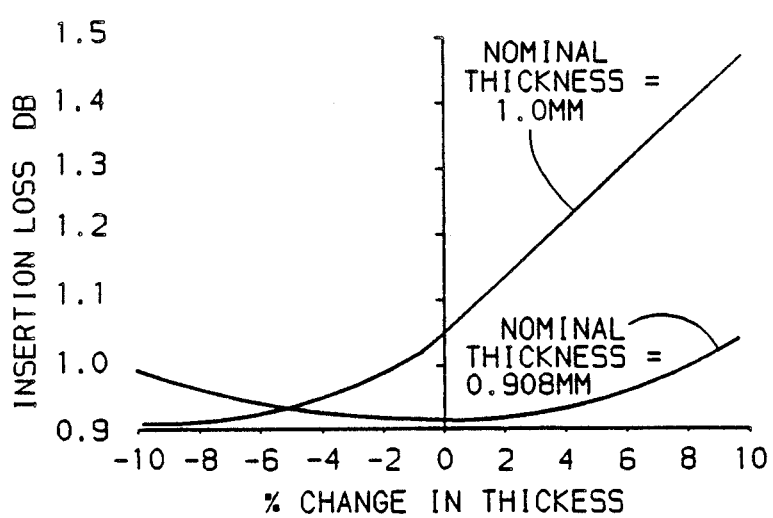
FIG. 5 is a graph illustrating the insertion loss due to geometrical mismatch versus change in ribbon thickness for two nominal ribbon core thicknesses.

In production of large quantities of optical star assemblies, some tolerances in part thicknesses can be expected. FIG. 5 illustrates how the insertion loss due to geometrical mismatch changes with a change in thickness. If the ribbon thickness t is nominally 0.908 mm (for a 1 mm fiber) a plus or minus 8% change in thickness yields an insertion loss which ranges from 0.92 to 0.99. If, however, the nominal thickness is 1 mm, the loss ranges from a minimum of 0.92 db to 1.38 db over a plus or minus 8% variation. The selection of the nominal correct value is thus important in a production situation. The 0.908 mm nominal thickness leads to a variation of 0.07 db over the +/− 8% range while the 1.0 mm nominal thickness results in 0.46 db variation for an 8% range. It is preferred, then to use ribbons having a thickness of substantially 91% of fiber diameter. An 8% variation in thickness is acceptable; thus the range of variation should be from about 84% to about 98% of fiber diameter.

An ancillary advantage of using a ribbon thinner than the fiber diameter is that the thinner the ribbon, the tighter curvature it can have without unacceptable losses due to curvature. In general, small curvature radii are avoided to minimize losses in the ribbon 48. For the ribbon 0.91 mm thick, a radius of curvature of 18 mm has been found to be acceptable for both the concave portion 52 and the convex portion 54. In this example, an acceptable loss of 0.1 db is experienced due to the curvature.

It will thus be seen that the insertion loss can be minimized by using a nominal ribbon thickness of 0.91 mm for a 1 mm fiber. It is understood that the minimum loss of 0.92 db does not take into account all the losses involved in the total insertion loss for the optical star but only that due to geometrical mismatch. The use of a connector to attach the fibers to the star allows the user to choose any combination of fiber lengths without having to splice. The curved mixing element permits the input and output fibers to mate to it on the same side. This enables one connector to be used instead of two and makes routing of the fibers away from the star easier. The design is adaptable to any number of nodes.

The embodiments of the invention in which an exclusive property or privilege is claimed are defined as follows:

1. A fiber optic star assembly for coupling signals between optical fibers comprising:
   first and second sets of optical fibers, the sets having contiguous fiber ends arranged in respective parallel linear arrays,
   a flexible optical ribbon bent into a non-planar configuration having a curved center portion and closely spaced parallel end portions, the minimum radius of curvature of the curved center portion being sufficiently large to avoid significant optical loss due to curvature, the end portions being spaced by a distance substantially less than the said minimum radius of curvature, the ribbon having a width substantially matching the width of each linear array, and
   means for holding each linear array of fiber ends in line with the ribbon end portions for coupling between the fibers and the ribbon.

2. The invention as defined in claim 1 wherein the curved center portion comprises a convex curve and at least one concave curve connecting the convex curve to an end portion.

3. The invention as defined in claim 1 wherein the curved center portion comprises a convex curve and a concave curve connecting each end of the convex curve to an end portion.

4. The invention as defined in claim 1 wherein the means for holding each linear array of fiber ends in line with the ribbon end portions comprises first and second mating connector parts, the first connector part secured to each linear array of fiber ends, and the second connector part secured to the ribbon end portions and holding each ribbon end portion in abutment with a respective array of fiber ends.

5. The invention as defined in claim 1 wherein the ribbon thickness is less than the fiber diameter by an amount which minimizes the insertion loss due to geometrical mismatch between the fibers and the ribbon.

6. The invention as defined in claim 5 wherein the ribbon thickness is on the order of 91% of the fiber diameter.

7. The invention as defined in claim 5 wherein the ribbon thickness is in the approximate range of 84% to 98% of the fiber diameter.

8. The invention as defined in claim 1 wherein the ribbon edges are rounded to conform to the shape of the outboard fibers of each array to minimize losses in coupling from the ribbon to the outboard fibers.

9. A fiber optic star assembly for coupling signals between optical fibers comprising:
   first and second sets of optical fibers, the sets having contiguous fiber ends arranged in respective parallel linear arrays,
   a flexible optical ribbon having spaced parallel end portions, the ribbon having a width substantially matching the width of each linear array, and wherein the ribbon edges are rounded to conform to the shape of the outboard fibers of each array to minimize losses in coupling from the ribbon to the outboard fibers,
   means for holding each linear array of fiber ends in line with the ribbon end portions for coupling between the fibers and the ribbon.

10. The invention as defined in claim 9 wherein the ribbon thickness is on the order of 91% of the fiber diameter to minimize loss between the fibers and ribbon due to geometrical mismatch.

11. The invention as defined in claim 9 wherein the ribbon thickness is in the range of 84% to 98% of the fiber diameter to minimize loss between the fibers and ribbon due to geometrical mismatch.

12. A fiber optic star assembly for coupling between two sets of fibers comprising:
   a housing,
   two sets of jacketed optical fibers extending into one end of the housing, each fiber having an end portion free of a jacket,
   apertured means in the said one end of the housing for holding each optical fiber,
   first connector means for holding the fiber end portions in two adjacent parallel linear arrays, one array for each set,
   an optical ribbon mixer having two adjacent parallel ends, each end aligned with and having the same width as a respective one of the linear arrays,
   second connector means removably coupled to the first connector means for holding the ribbon mixer ends abutted against the fiber ends, and
   the ribbon mixer being curved in a non-planar shape connecting the two ends, the curvature being small enough to avoid significant optical loss due to the ribbon curvature.

13. The invention as defined in claim 12 wherein the ribbon has a thickness on the order of 91% of the fiber diameter.

14. The invention as defined in claim 12 wherein the sides of the ribbon aligned with outboard fibers in each array are rounded to conform to the shape of the outboard fibers.

* * * * *